US005675670A

United States Patent [19]

Koide

[11] Patent Number: 5,675,670

[45] Date of Patent: Oct. 7, 1997

[54] OPTICAL PROCESSOR USING AN ORIGINAL DISPLAY HAVING PIXELS WITH AN APERTURE RATIO LESS THAN THAT FOR PIXELS IN AN OPERATION PATTERN DISPLAY

[75] Inventor: Kohshi Koide, Chiba, Japan

[73] Assignee: Sharp Kabushiki Kaisha, Osaka, Japan

[21] Appl. No.: 417,012

[22] Filed: Apr. 5, 1995

[30] Foreign Application Priority Data

May 30, 1994 [JP] Japan .................................... 6-116441
Dec. 14, 1994 [JP] Japan .................................... 6-310496

[51] Int. Cl.[6] .............................. G06K 9/36; G06K 9/76; G06F 15/332

[52] U.S. Cl. .......................... 382/281; 382/211; 382/212; 359/559

[58] Field of Search .................................... 382/210–212, 382/250, 281, 307; 359/11, 560–561, 107–108, 559

[56] References Cited

U.S. PATENT DOCUMENTS 3,969,699 7/1976 McGlaughlin .......................... 382/281
4,972,498 11/1990 Leib .......................................... 382/211
5,072,314 12/1991 Chang ...................................... 359/559
5,274,716 12/1993 Mitsuoka et al. ........................ 382/210
5,537,492 7/1996 Nakajima et al. ...................... 382/212

FOREIGN PATENT DOCUMENTS 5333398 5/1992 Japan .

OTHER PUBLICATIONS

A. Akiba, et al., "Fundamental Study on a Microoptic . . .", Optics (Kougaku); pp. 507 (43) –513 (49); May 20, 1991.
K. Hamanaka, et al., "Parallel Processing Using Microlens Arrays", pp. 59–64, 1991.
K. Hamanaka, et al., "Planar Microlens Array . . . "; Proceedings of 6th Meeting on Lightwave Sensing Technology; pp. 107–114.
I. Glaser, "Noncoherent Parallel Optical . . . ", Optics Letters; pp. 449–451; Jun. 23, 1980.
K. Hamanaka, et al., "Multiple Imaging and Multiple . . . ", Applied Optics; pp. 4064–4070; Oct. 1, 1990.

*Primary Examiner*—Leo Boudreau
*Assistant Examiner*—Bhavesh Mehta

[57] ABSTRACT

A optical processor facilitates the alignment between an original image and transformation patterns, thus improving the operation accuracy, and, if a fixed transmission mask is to be used, facilitates the fabrication of the fixed transmission mask. The optical processor includes an original image display to display an original image and a pattern display to display the patterns for a transformation on the original image displayed on the original image display. In the optical processor, the original image display is os made as to have pixels with a smaller aperture ratio than that of the pixels of the pattern display.

11 Claims, 12 Drawing Sheets

OPTICAL PROCESSOR USING AN ORIGINAL DISPLAY HAVING PIXELS WITH AN APERTURE RATIO LESS THAN THAT FOR PIXELS IN AN OPERATION PATTERN DISPLAY

BACKGROUND OF THE INVENTION

1. Field of the Invention

The present invention relates to an optical processor and, in particular, to an optical processor optically performing multiplication on data sets arranged in two dimensions.

2. Description of the Related Art

In the present multimedia society, it is desired to transmit or accumulate image data containing a huge amount of information as one important medium.

It is recent common practice to digitize image data because they are easy to process by computers and good at image preservation. However, digitized still or moving image data are huge in amount, so they are very difficult to record or transmit in their original form because of the insufficient capacity of present recording devices and digital circuits. For example, the amount of information displayed on one television screen is about one megabyte, and the television images for one second contain about 30 megabytes of information. Under such circumstances, a technique to compress image data information is essential for recording or transmitting them.

Existing image compression and reconstruction techniques are mostly based on the digital technology making use of computers. Because of the limitation in processing speed of the computers used for that, the display screen is in principle divided into a large number of small blocks and the processing takes place on each of the divided blocks of the screen. According to a typical, internationally standardized compression method, the entire display screen consisting of, for example, 480 dots in height by 640 dots in width is divided into square blocks each consisting of 8 by 8 dots. Each of these blocks is independently converted by using two-dimensional orthogonal base patterns into a discrete cosine transform (abbreviated to DCT) or a Walsh-Hadamard transform (abbreviated to WHT), which is electrically processed. The expansion coefficients in these transformations range from low-to high-frequency components, with power normally concentrated in the low-frequency components.

With consideration for the visibility curve, it is possible to reduce the amount of data as a whole by eliminating the high-frequency components while conserving the low-frequency components. In the image reconstruction section, square intermediate pixels each consisting of 8 by 8 pixels are obtained from the transmitted data by using a provided set of two-dimensional orthogonal base patterns. By repeating this step, a reconstructed image as a whole can be obtained.

Because the orthogonal transformation in this method requires a large number of multiplying and adding operations, fast processing is necessary for compression or reconstruction of moving images in real-time. For that, a system for optically performing this series of processing is disclosed in Application Laying Open (KOKAI) No. 5-333398. The system disclosed in this application has an image compression section which uses a time multiple expansion method and has the structure shown in FIG. 13. The operation principle of the multiplier, employed in this system is described below with reference to FIG. 13. The light radiated from a light source 102 is transmitted through first spatial a light modulator 103 (abbreviated to SLM hereafter), which displays the input image (original image), and reaches a second SLM 105 where an orthogonal transformation takes place on the light by the orthogonal transformation patterns displayed here, followed by condensation by a lens 107 onto a photodetector 108. That is to say, the operation principle of the multiplying and adding operations is that the original image is displayed on first SLM 103 such as a liquid crystal display and, within the period of displaying the original image, the orthogonal transformation patterns $W_{uv}$ (m, n) are replaced on second SLM 105 in succession with regard to u and v.

Application Laying Open (KOKAI) No. 5-333398 also proposes a spatial multiple expansion method using an orthogonal transformation mask consisting of a two-dimensional lens array and a fixed transmission mask and a photodetector array, and a time-spatial multiple method which is a combination of the time and spatial multiple expansion methods. The fixed transmission mask is normally fabricated by photolithography or electron beam drawing on a transparent substrate or photographic film.

In such existing image compression devices, pixels with an aperture ratio of nearly 100 percent are used in both the original image display means consisting of, among others, an SLM and the orthogonal transformation pattern display means consisting, among others, an SLM and orthogonal transformation mask (fixed transmission mask).

SUMMARY OF THE INVENTION

In existing optical processors, however, imperfections can occur in the result of an multiplying operation, namely, in the alignment between the original image and the mask patterns for optical operations. In the case of the spatial multiple expansion method, the fixed transmission mask patterns are fabricated using, among others, photolithography and this means that it is difficult to fabricate the perfect mask. A blurred contour of the fixed transmission mask will result in a degraded logical operation accuracy.

The present invention is made for the purpose of resolving the above-stated problems and has the object of providing an optical processor which will facilitate the alignment between original image and orthogonal transformation patterns and allow the correct alignment to be obtained even if imperfections are present in the drawing of the mask pattern contour, thus improving the logical operation accuracy.

To resolve the problems stated above, the optical processor according to the invention includes an original image display section to display an original image and a pattern display section to display the patterns for selective transmission of the light coming from of the original image displayed on the original image display section is so made that the original image display section has pixels with a smaller aperture ratio than the pixels of the pattern display section.

According to the invention, the original image display section has pixels with an aperture ratio derived from the alignment accuracy between the original image display section and a pattern orthogonal transmission display section or the drawing accuracy of the orthogonal transmission pattern display section and from the size of the pixels of the pattern display section.

According to the invention, the optical processor has an original image display section and a pattern display section, at least one of which consists of a spatial optical modulator.

According to the invention, the optical processor has a pattern display means which uses a fixed transmission mask on which patterns are so drawn as to cover the apertures of the pixels of the original image display section.

On the optical processor according to the invention, the original image display section has pixels with a smaller aperture ratio than the pixels of the pattern display section. This configuration is realized by aligning the center of the pixels of the original image display section with the center of the apertures of the pixels of the pattern display section and setting the aperture area of the pixels of the original image display section relatively small to the aperture area of the pixels of the pattern display section.

With this setup, logical operations are possible to execute even if some degree of misalignment exists between the two display section, namely, the original image display section and pattern display section, in a direction perpendicular to the traveling direction of the light ray. This facilitates alignment between the original image and patterns, and can improve the logical operation accuracy. Moreover, if a fixed transmission mask is to be used in the pattern display section, this mask can be fabricated easily.

As described above, the optical processor according to the invention has the following effects:

(1) Because the aperture ratio of the pixels of the original image display section to display an original image is set smaller than the aperture ratio of the pixels of the pattern display section to display patterns, alignment between an original image f (m, n) and patterns $W_{uv}$ (m, n) becomes easier to do and the logical operation accuracy of the optical processor can be improved.

(2) When a fixed mask is used in the spatial multiple expansion method, the aperture ratio of the pixels of the original image display section to display an original image is set smaller than the aperture ratio of the pixels of the fixed transmission mask bearing patterns. This setup does not require a mask with the perfect contour, but only requires fabricating a fixed transmission mask that can merely cover the apertures of the original image. Therefore, high accuracy is not required in mask fabrication, namely, the fixed transmission mask can be easily fabricated. Cost reduction is possible with such a fixed transmission mask.

Further objects and advantages of the present invention will be apparent from the following description of the preferred embodiments of the present invention as illustrated in the accompanying drawings.

DESCRIPTION OF THE PREFERRED EMBODIMENTS

Embodiments of the invention will be described below with reference to the accompanying drawings. In the following embodiments, the original image is subjected to an orthogonal transformation.

Figure 1:
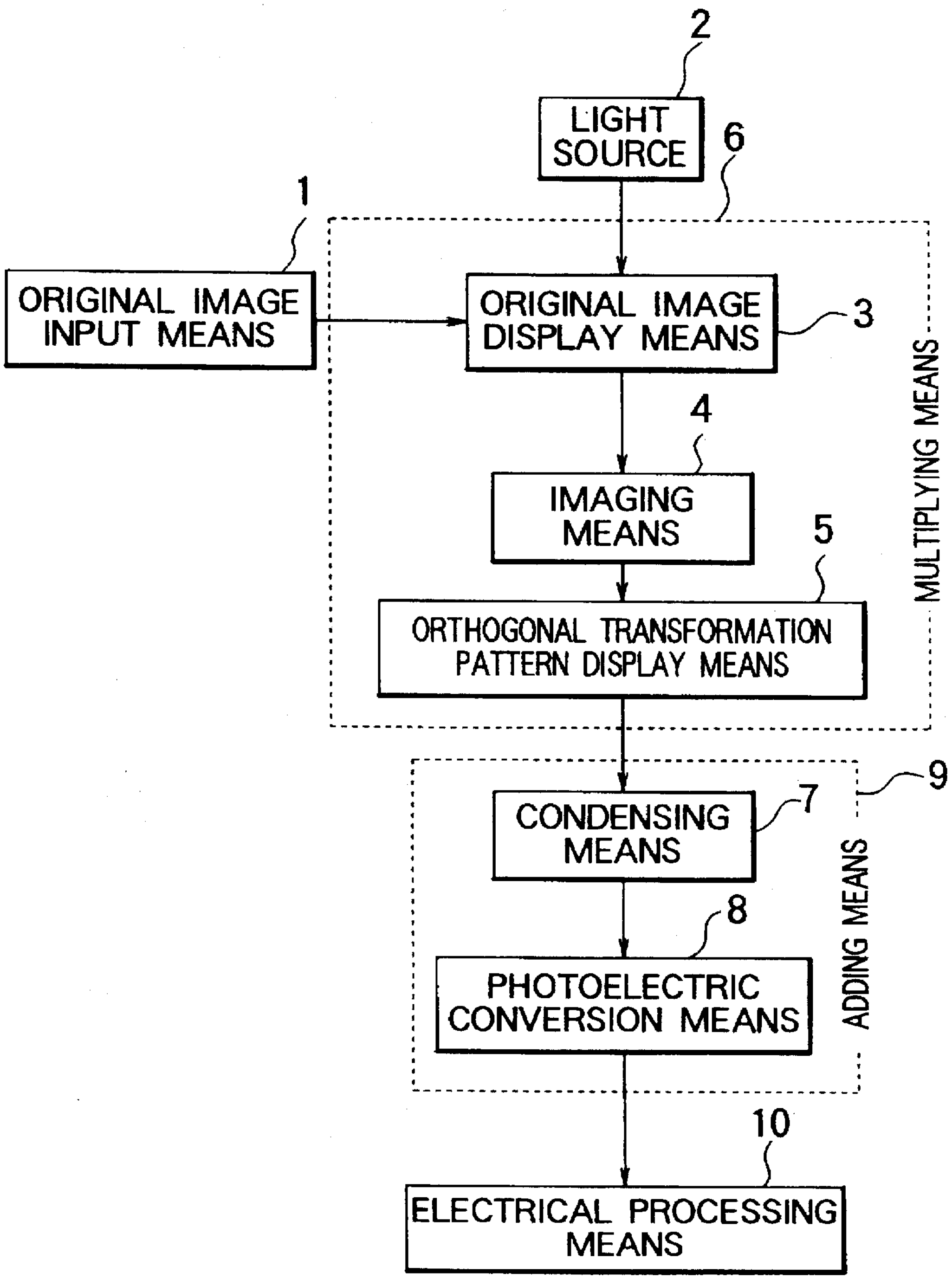
FIG. 1 is a block diagram showing the structure of an optical processor embodied according to the present invention.

FIG. 1 is a block diagram showing the basic setup of an optical processor according to the invention. In this figure, there are an original image input means 1, a light source 2, an original image display 3, an imaging means 4, and orthogonal transformation pattern display section 5. The original image display 3, the imaging section 4 and an orthogonal transformation pattern display 5 make up a multiplier 6. There are also a condenser 7 and opto-electric converter 8. The condenser 7 and opto-electric converter 8 make up an adder 9. Finally, the optical processor includes an electrical processor 10.

As shown in FIG. 1, an original image f (m, n) is sent from the original image input 1, such as an image recorder or camera, to the multiplier 6, where the original image f (m, n) is displayed on original image display 3. The light source 2 radiates beams of light with almost uniform intensity which are transmitted through the original image display 3 and the original image f (m, n) is imaged by the imager 4 into the plane of the orthogonal transformation patterns displayed on the orthogonal transformation pattern display 5. On the orthogonal transformation pattern display 5, patterns are drawn with a transmissivity factor of 0% or 100% in contrast. A multiplying operation takes place when the beams of light having participated in that imaging are transmitted through the orthogonal transformation pattern display 5. Then, the beams of light transmitted through the orthogonal transformation pattern display 5 are condensed by the condenser 7 onto the opto-electric converter 8, where the light signal is converted into an electrical signal which enters the electrical processor 10. As above, the original image display 3, imager 4 and orthogonal transformation pattern display 5 act as the multiplier 6, and the condenser 7 and opto-electric converter 8 act as adder 9.

Figure 2:
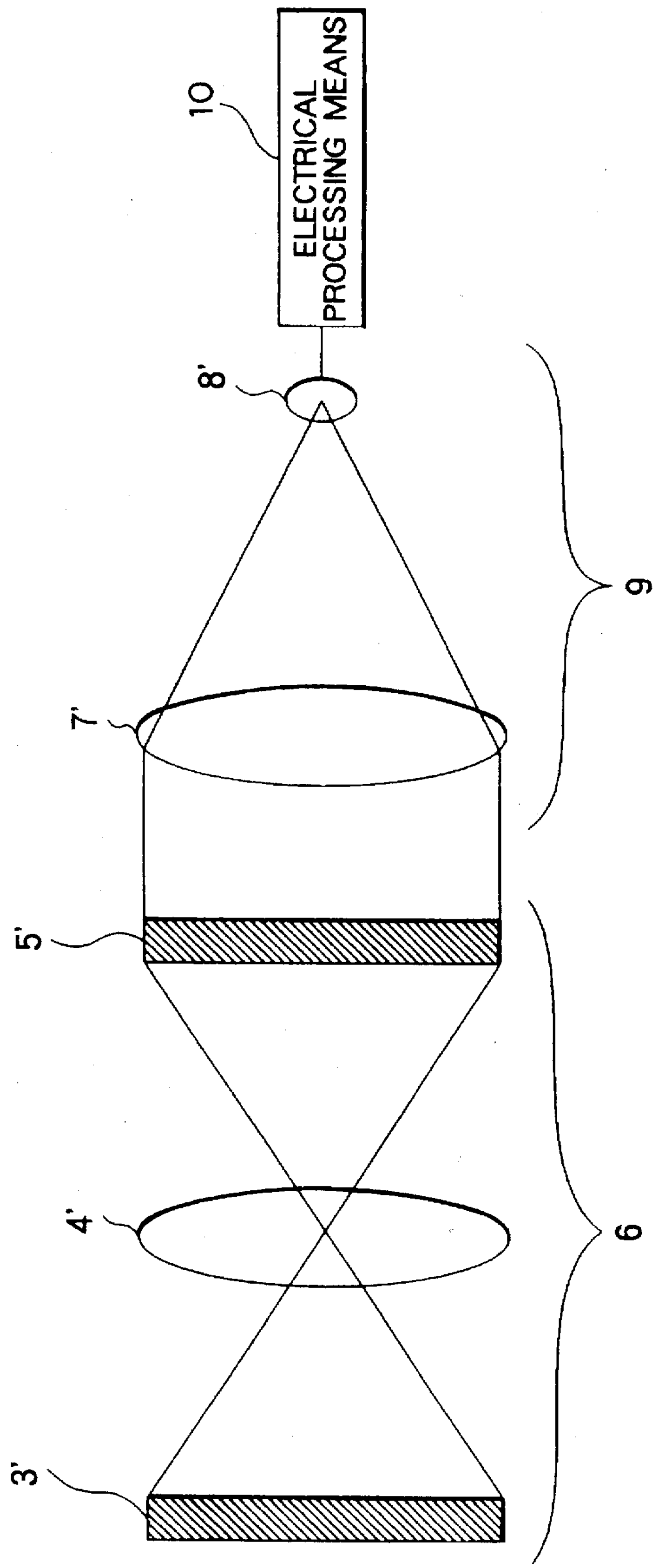
FIG. 2 illustrates the structure of the optics for the multiplying section and the adding section of the embodiment in FIG. 1.

FIG. 2 represents schematically the optical setup of the optical processor shown in FIG. 1. As FIG. 2 indicates, a first spatial light modulator 3' (abbreviated to SLM hereafter) can be used as the original image display 3 and a second SLM 5' as the orthogonal transformation pattern display 5.

For the first SLM 3' and the second SLM 5', a liquid crystal panel, among others, may be used.

A first lens 4' and a second lens 7' are used as imager 4 and condenser 7, respectively. The relative position of the first SLM 3', the first lens 4' and the second SLM 5' is in an imaging relationship. For equal magnification imaging, for example, they are spaced from each other at a distance of twice the focal length of the lens. Thus, the pencils of light transmitted through the second SLM 5' are condensed by the condenser 7, namely, by the second lens 7', and converted by opto-electric converter 8, namely, by a photodetector 8', into an electrical signal. The converted signal is sent to the electrical processor 10 where corrections are made on it to obtain the frequency components of the original image.

The pixels of the first SLM 3' have a smaller aperture ratio than the pixels of the second SLM 5'. An example for that is described conceptually referring to FIG. 3. In the case, as in FIG. 3, where the first SLM 3' on which an original image is displayed has pixels with an aperture ratio of about 10% and the second SLM 5' on which orthogonal transformation patterns are displayed has an aperture ratio of about 100%. In this particular example, the original image (the black area on this figure) of the alphabetic letter "A" is displayed on the first SLM 3', the orthogonal transformation patterns is displayed on the second SLM 5', and their operation result are as shown in this figure. The aperture ratio of the pixels of the first and second SLMs referred to here does not mean the aperture ratio of an SLM as a whole but the aperture ratio of each pixel of that SLM.

Figure 3:
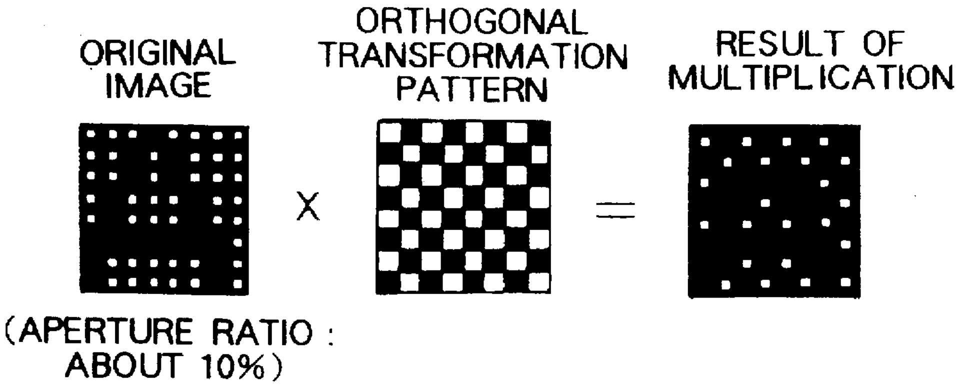
FIG. 3 illustrates an example of multiplication and its results of the embodiment in FIG. 1.

In FIG. 3, an original image displayed on first SLM 3' and the orthogonal transformation patterns displayed on second SLM 5' consist of 8 by 8 pixels respectively. The center of each pixel of first SLM 3' is aligned with the center of each corresponding pixel of second SLM 5', and the pitch of the pixels of first SLM 3' is equal to the pitch of the pixels of second SLM 5'. However, the aperture area of the pixels of first SLM 3' is smaller than that of second SLM 5'. This may be not clear from the black pixels shown in FIG. 3 but will be apparent by observing the white pixels.

Figure 13:
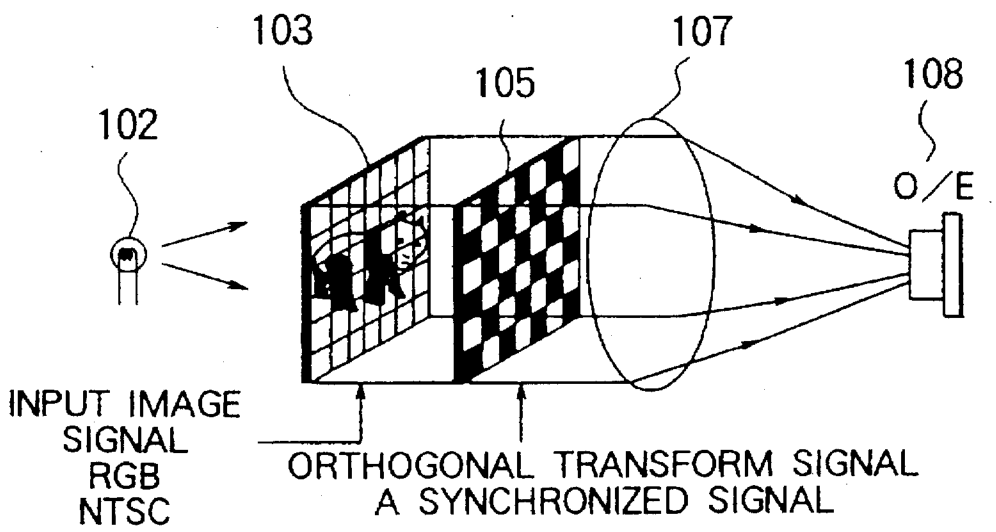
FIG. 13 PRIOR ART
FIG. 13 shows the setup of an existing optical processor in the time multiple expansion method.

If, as shown in FIG. 3, first SLM 3' has pixels with a smaller aperture ratio than second SLM 5', no imperfection will occur, in contrast to the existing case shown in FIG. 13, in the result of the multiplying operation, namely, in the alignment between the original image and the orthogonal transformation patterns even if the first SLM 3' and the second SLM 5' are misaligned to some extent in the vertical direction as a beam of light proceeds.

In the embodiment above, the second SLM used as the orthogonal transformation pattern display 5 can be used in the time multiple expansion method or time-spatial multiple expansion method. In the case of the spatial multiple expansion method, a fixed transmission mask can be used, instead of the second SLM, as the orthogonal transformation pattern display 5, and this fixed transformation mask can be fabricated using a transparent substrate or photographic film and by photolithography or electron beam drawing.

How particular processing is performed by each component of the embodiment above is described below, using arithmetic expressions and based on the processing operations in FIG. 2. For simplicity of description, the optical processing by the Walsh-Hadamard forward transformation is performed, using the system in the embodiment above, on a two-dimensional original image f (m, n) of 8 dots (abscissa: m) by 8 dots (ordinate: n). However, the present invention is not limited to the number of dots or the kind of orthogonal transformation.

First, beams of the light are irradiated from light source 2 onto the first SLM 3' with uniform intensity. As shown in FIG. 2, an original image f (m, n) is displayed on first SLM 3' consisting of pixels with a smaller aperture ratio than the pixels of second SLM 5' which displays orthogonal transformation patterns $W_{uv}$ (m, n). The original image is then imaged by the imager 4, namely, by first lens 4', into the plane of the orthogonal transformation patterns $W_{uv}$ (m, n) displayed on orthogonal transformation pattern display 5, namely, on second SLM 5'. In conventional devices, the original image and the orthogonal transformation patterns had to be in perfect alignment. In this embodiment, however, each pixel of the original image f (m, n) defined by a pair of m and n has such an aperture ratio that it is contained in the corresponding pixel of the orthogonal transformation patterns $W_{uv}$ (m, n) defined by the same pair of m and n.

The orthogonal transformation patterns $W_{uv}$ (m, n) can be represented by Equation (1). In Equation (1), $WHT_{uv}$ (m, n) are the base functions for a two-dimensional Walsh-Hadamard transformation.

$$W_{uv}(m,n)=\frac{WHT_{uv}(m,n)+1}{2} \quad (1)$$

Figure 4:
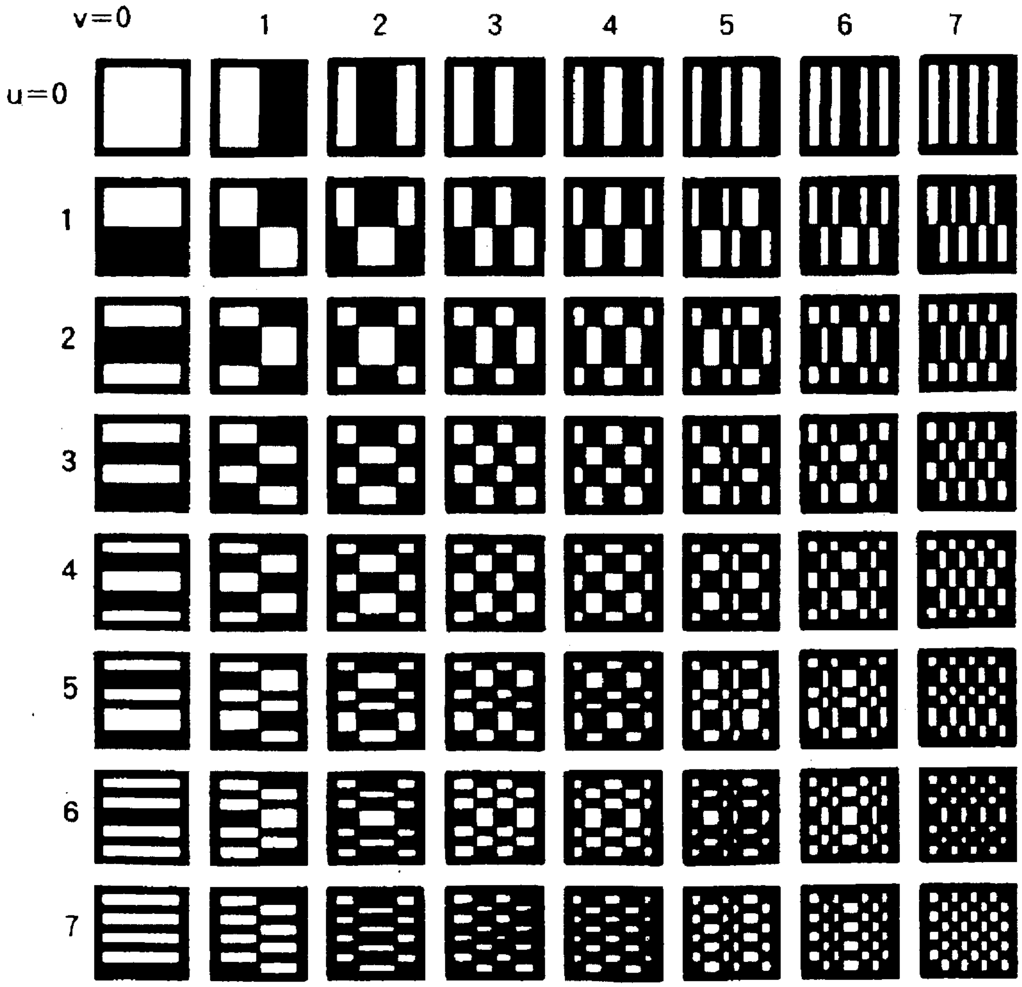
FIG. 4 illustrates Walsh-Hadamard orthogonal transformation patterns of 8 by 8 blocks to be displayed on the orthogonal transformation pattern display section.

FIG. 4 shows the orthogonal transformation patterns $W_{uv}$ (m, n) represented by Equation (1), with the white area denoting +1 and the black area −1.

Thus, the original image is projected onto the orthogonal transformation pattern display, namely, the second SLM 5' where the multiplying operations represented by Equation (2) take place between it and each orthogonal transformation patterns $W_{uv}$ (m, n) represented by Equation (1) and defined by a pair of u and v, resulting in $f'_{uv}$ (m, n).

$$f_{uv}(m,n)=f(m,n)W_{uv}(m,n) \quad (2)$$

Then, the beams of light transmitted through orthogonal transformation patterns $W_{uv}$ (m, n) displayed on the orthogonal transformation pattern display 5, namely, the second SLM 5' are condensed by the condenser, namely, the second lens 7' onto the opto-electric converter 8, namely, the photodetector 8', and undergo the adding operations represented by Equation (3) for all m's and n's, resulting in F' (u, v). Using the Walsh-Hadamard expansion coefficients F (u, v), F (u, v) may also be represented by the last expression in the Equation (3).

$$\begin{aligned} F'(u,v) &= \Sigma_m\Sigma_n f'_{uv}(m,n) \\ &= \Sigma_m\Sigma_n f(m,n)W_{uv}(m,n) \\ &= \Sigma_m\Sigma_n f(m,n)\frac{WHT_{uv}(m,n)+1}{2} \\ &= 4[F(u,v)+F(0,0)] \end{aligned} \quad (3)$$

Then, the electrical signal obtained by opto-electric conversion means 8, namely, photodetector 8', is processed in electrical processor 10 by Equation (4), that is, converted into the Walsh-Hadamard expansion coefficients F (u, v) of the original image f (m, n), which correspond to the orthogonal transformation patterns $W_{uv}$ (m, n), respectively.

$$F(u,v)=\frac{F'(u,v)}{4}-\frac{F'(0,0)}{8} \quad (4)$$

It is found from the above that the Walsh-Hadamard expansion coefficients of a two-dimensional original image f (m, n) of 8 by 8 dots, namely, its frequency components F (u, v) can be derived optically with this system.

Figure 5:
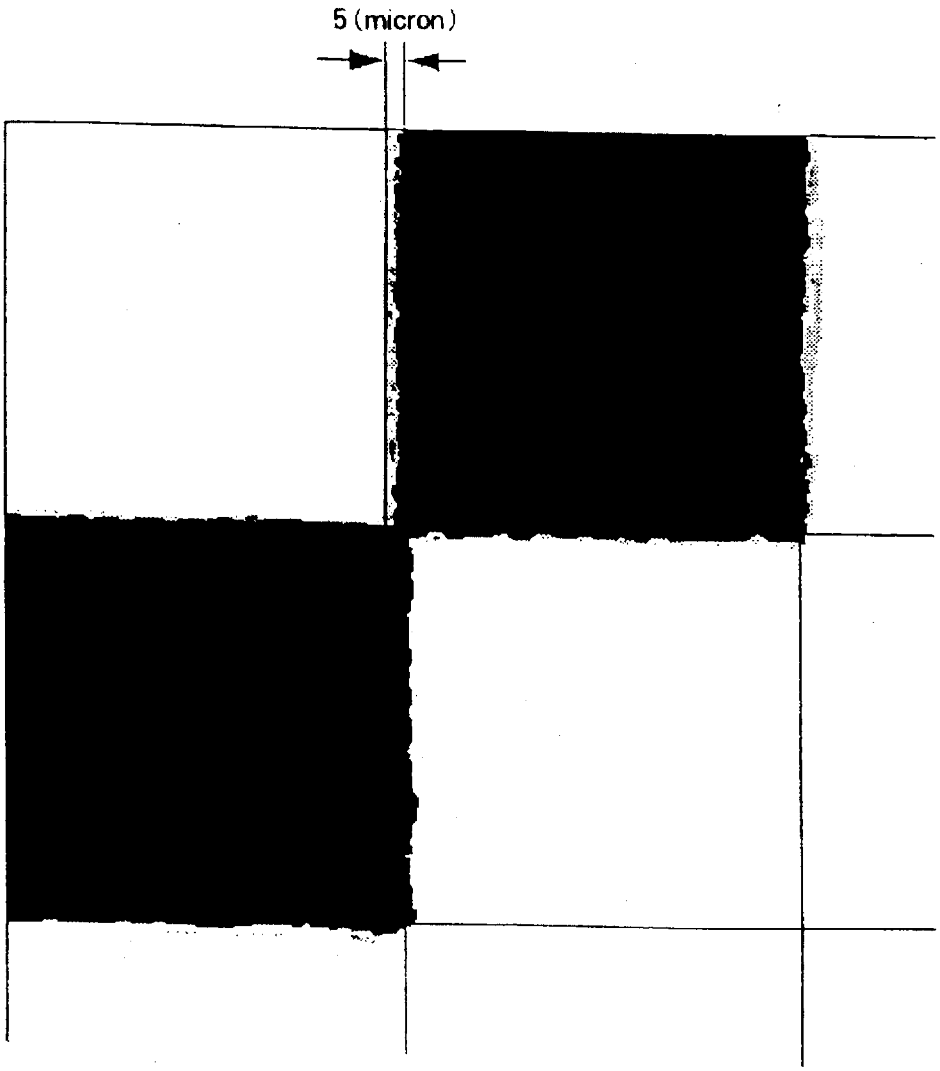
FIG. 5 illustrates imperfect drawing of the orthogonal transformation patterns on a fixed mask of an existing optical processor.

How large the aperture ratio of the pixels of the original image display is to be set is described below. The reason why the original image display has pixels with a reduced aperture ratio is, as described above, the mechanical problem of the system, namely, alignment accuracy between the original image and the orthogonal transformation patterns and imperfections in the pattern drawing on the orthogonal transformation pattern display. For example, if the alignment accuracy attainable is 1 μm and, as shown in FIG. 5, there is an imperfection of 5 μm in the pattern drawing, the aperture ratio of the pixels of the original image display must be reduced to the level below that at which the original image will not fall upon that imperfect region of 5 m. Conversely, if the system's alignment accuracy attainable is as low as 10 μm while the pattern drawing is perfect, the aperture ratio of the original image display must be reduced so that a sufficient overlap is secured between the original image and orthogonal transformation patterns even for a misalignment of 10 μm.

Figure 6:
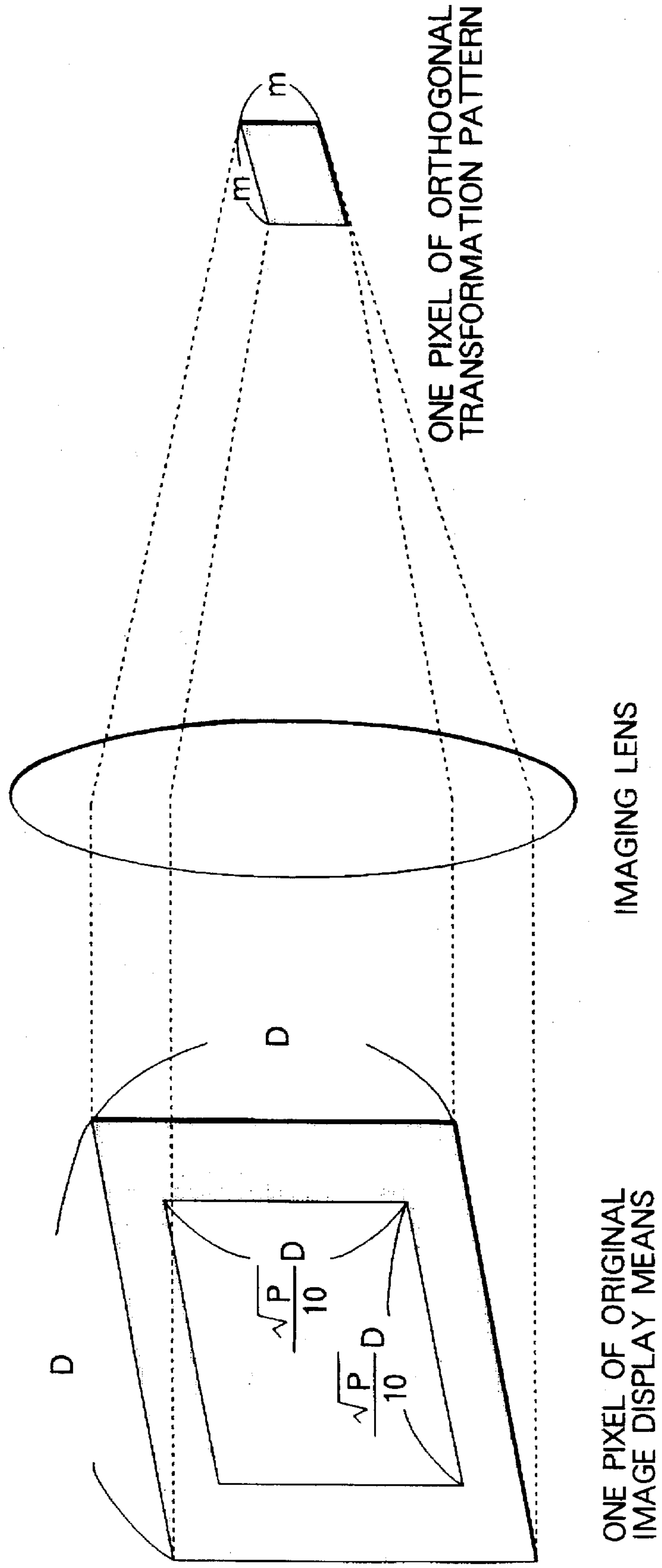
FIG. 6 is a magnification of one pixel, showing the alignment, by a lens, of pixels of an original image display section with pixels of an orthogonal transformation pattern display section in the invention.
Figure 7:
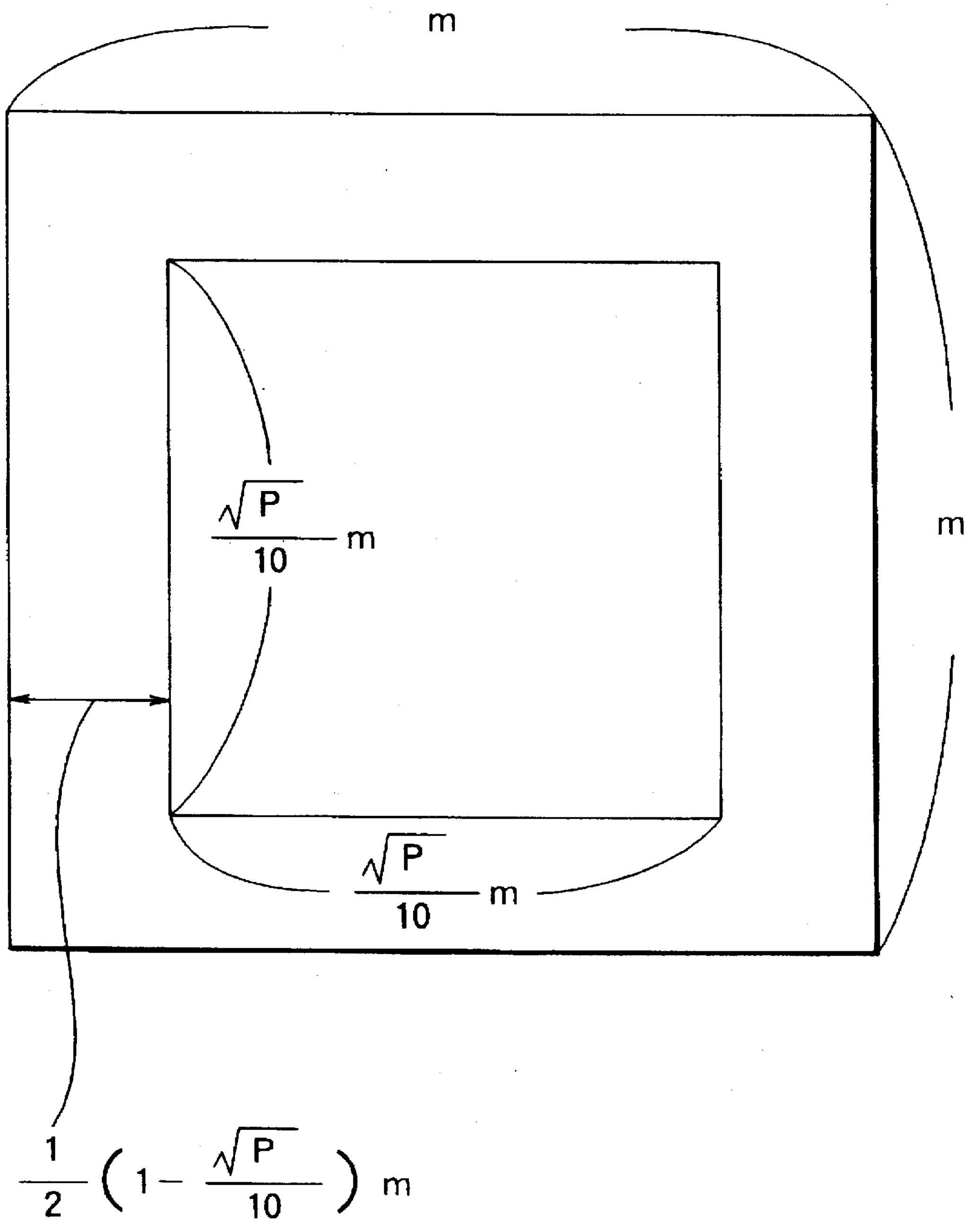
FIG. 7 is a magnification of one pixel, illustrative of how to set up the aperture ratio of the pixels of an original image display means according to the invention.

Numerical consideration is given below, with reference to FIG. 6, regarding how to set this aperture ratio. FIG. 6 is a magnification of one pixel, showing the alignment, by an imaging lens, of the pixels of the original image display with the pixels of the orthogonal transformation pattern display means. Let a pixel of the original image display be a square with four sides of the length D (in micrometers) and with the aperture ratio P (in percent), and a pixel of the orthogonal transformation patterns be a square with four sides of the length m (in micrometers). That is, one pixel of the original image, namely, a square of the size D (in micrometers) is aligned with one pixel of the orthogonal transformation patterns, namely, a square of the size m (in micrometers). The original image is reduced by the imaging lens by the factor m/D, resulting in a size of m by m (in micrometers). FIG. 7 is a magnification of one pixel of the reduced original image. The aperture is (√P/10) by m (in micrometers) in size and is imaged in such a way that the image falls within a pixel of the orthogonal transformation patterns. The distance from an edge of the orthogonal transformation patterns to a side of the aperture of the original image is (½)×(1−√+e,rad +ee P/10)×m micrometers. Here, let the larger of the alignment accuracy and the largest imperfection in orthogonal transformation pattern drawing in this embodiment be I (in micrometers). It is acceptable if the value of I is smaller than the distance from an edge of the orthogonal transformation patterns to a side of the aperture of the original image, (½)×(1−√+e,rad +ee P/10)×m micrometers. Therefore, the aperture ratio P is acceptable if it is smaller than the value derived from Equation (5). However, setting it too small compared to this value will result in a transmission light with feeble intensity, making the opto-electric conversion difficult. Accordingly, it is desirable to set the aperture ratio to the value derived from Equation (5).

$$P=(10-20\times I/m)^2[\%] \qquad (5)$$

Figure 8:
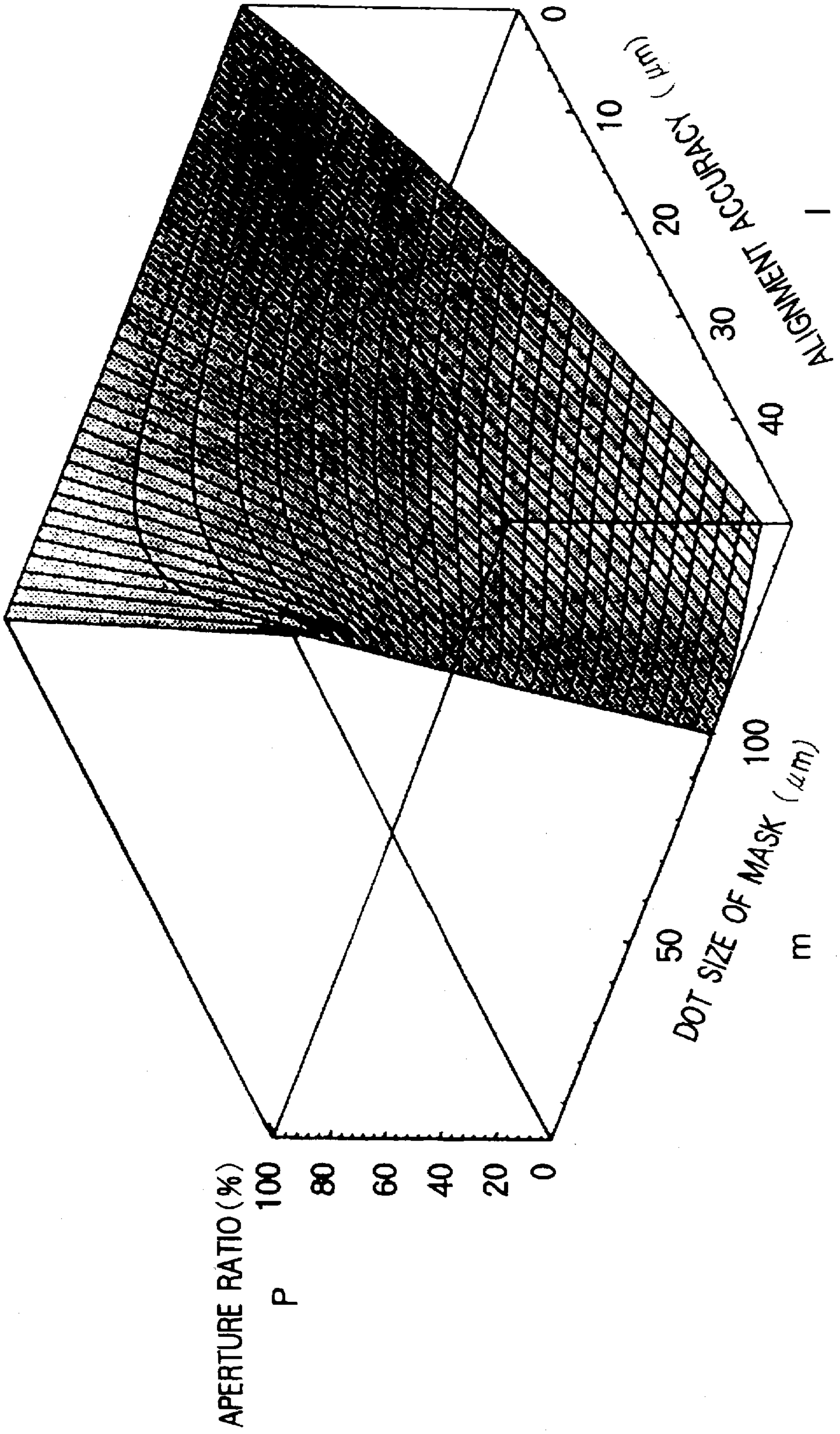
FIG. 8 is a graphic representation of the optimum aperture ratio for the pixels of an original image display section according to the invention.

FIG. 8 is a graph of this ideal aperture ratio P (%) represented in three dimensions against the size m (in micrometers) of one pixel of the orthogonal transformation patterns and the value of I (in micrometers), which is the larger of the alignment accuracy and the largest imperfection in orthogonal transformation pattern drawing of this embodiment. The three axes represent alignment accuracy, dot size of the mask, and aperture ratio, respectively. The present invention thus allows the aperture ratio P (%) optimum to the pixels of the original image display means to be set according to the alignment accuracy, namely, the magnitude of misalignment of the system used and the orthogonal transformation pattern drawing accuracy.

Experimental results of the embodiment above are described below. This experiment employed photographic film instead of an SLM, and the two original images used consisted of the alphabetic character "A" drawn with 8 by 8 dots (the size of one dot is 114 by 114 micrometers) on the film with the aperture ratio of the pixels being 100% and 11.1%, respectively. As the orthogonal transformation pattern display, four fixed transmission masks were used. The masks consisted of Walsh-Hadamard patterns of 8 by 8 blocks drawn on the film with the aperture ratio of their pixels being all 100% and with the size of one dot being 20 by 20, 30 by 30, 50 by 50, and 114 by 114 micrometers.

The orthogonal transformation patterns thus drawn on the photographic film had a drawing accuracy of 5 μm and the experiment system has an alignment accuracy of 1 μm. Letting I=5 μm, the aperture ratio of the pixels of the original image display means can, therefore, be set for the four masks with different dot sizes from Equation (5), namely, preferably below 25% for the 20-micrometer mask, 44% for the 30-micrometer mask, 64% for the 50-micrometer mask, and 83% for the 114-micrometer mask, respectively. This experiment was conducted with original image display means all having pixels with an aperture ratio of 11.1%, according to the conditions of the present invention.

The experiment is described below based on FIG. 2. The original image (which corresponds to first SLM 3') is equally magnified or reduced by first lens 4' and imaged into the plane of the fixed transmission mask, which corresponds to second SLM 5'. Here, the original image was reduced in the case where the fixed transmission mask used had either of dot sizes of 20 by 20, 30 by 30 and 50 by 50 micrometers, and equally magnified in the case where the mask used had a dot size of 114 by 114 micrometers. The operations that follow are the same as described in the previous embodiment.

Figure 9:
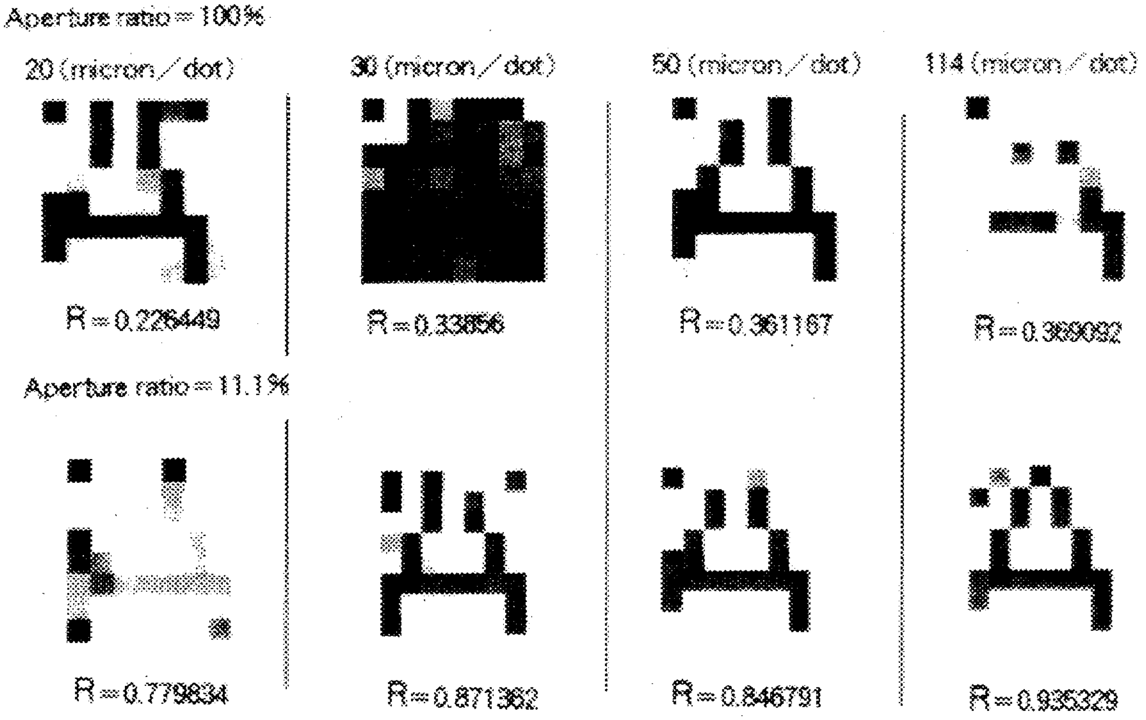
FIG. 9 illustrates the results of the operation by this embodiment.

Thus, Walsh-Hadamard expansion coefficients were obtained and they were inverse-transformed by computer into reconstructed images which are shown in FIG. 9. In FIG. 9, the upper part shows the results for the original image with an aperture ratio of 100%, and the lower part shows the results for the original image with an aperture ratio of 11.1%. The upper and lower parts show the results for the Walsh-Hadamard patterns with dot sizes of 20, 30, 50, and 114 micrometers, respectively. In this figure, the values R were derived from Equation (6), and the values given in units of micron/dot denote the size of one dot of the Walsh-Hadamard patterns.

$$R=\frac{\sum_{uv}(F(u,v)\cdot\bar{F}(u,v))}{\sqrt{\sum_{uv}F^2(u,v)\cdot\sum_{uv}\bar{F}^2(u,v)}} \qquad (6)$$

$\bar{F}$ (u, v): Frequency component (experimental)
F (u, v): Frequency component (theoretical)

That is, the value R is the inner product of a theoretical value and an experimental value in the frequency space and can be used to evaluate the logical operation results. The value R will be one if the experimental value agrees with the theoretical value and approaches zero in proportion as the experimental value differs widely from the theoretical value. It was found that the logical operation results in this embodiment had preferable values for R.

Figure 10:
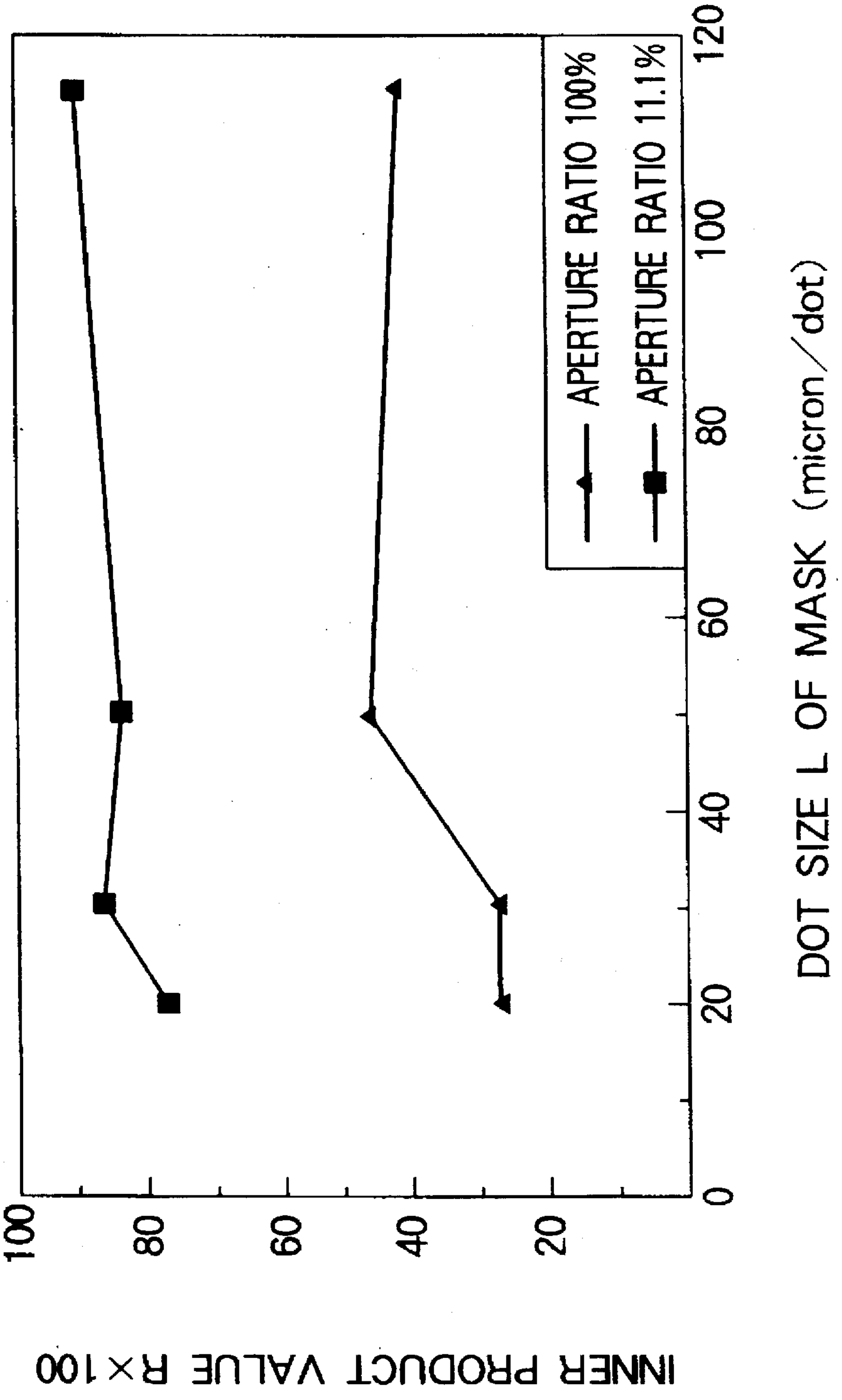
FIG. 10 is a graphical representation of the results in FIG. 9.

The relationship between this inner product value R and the dot size of the Walsh-Hadamard patterns on the fixed transmission mask is graphically represented in FIG. 10, for original images with aperture ratios of 100% and 11.1%, In this figure, ordinates represent inner product values R multiplied by 100 and abscissas represent dot size of the Walsh-Hadamard patterns of the fixed transmission mask. It can be seen from FIG. 10 that the present invention improves the logical operation accuracy.

Figure 11:
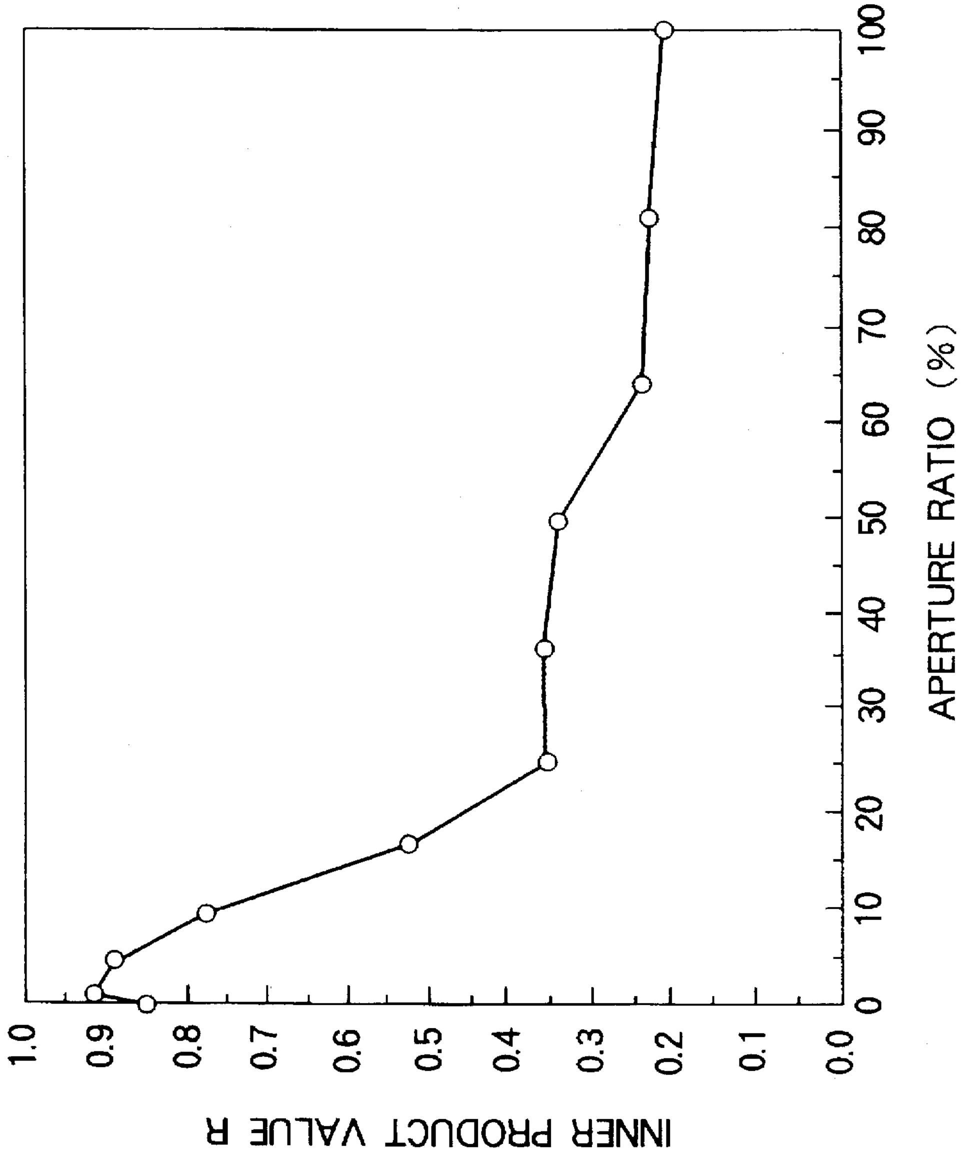
FIG. 11 is a graphical representation of relationship between the aperture ratio of an original image display section according to the invention and the inner product value of its experimental and theoretical values.

The next experiment was conducted using a mask having orthogonal transformation patterns with a dot size of 20 by 20 micrometers and an original image input means having pixels with varying aperture ratios from 0.25 to 100%. The results of this experiment were used, in the same manner as above, to obtain inner product values R, which are shown in Table 1 and graphically represented in FIG. 11. The axis of ordinates of this figure denotes inner product value and the axis of abscissas denotes aperture ratio.

TABLE 1

| Aperture ratio (%) | R |
|---|---|
| 100.000 | 0.226 |
| 81.000 | 0.240 |
| 64.000 | 0.250 |
| 49.000 | 0.350 |
| 36.000 | 0.365 |
| 25.000 | 0.362 |
| 16.000 | 0.532 |
| 9.000 | 0.776 |
| 4.000 | 0.891 |
| 1.000 | 0.910 |
| 0.250 | 0.850 |

Figure 14:
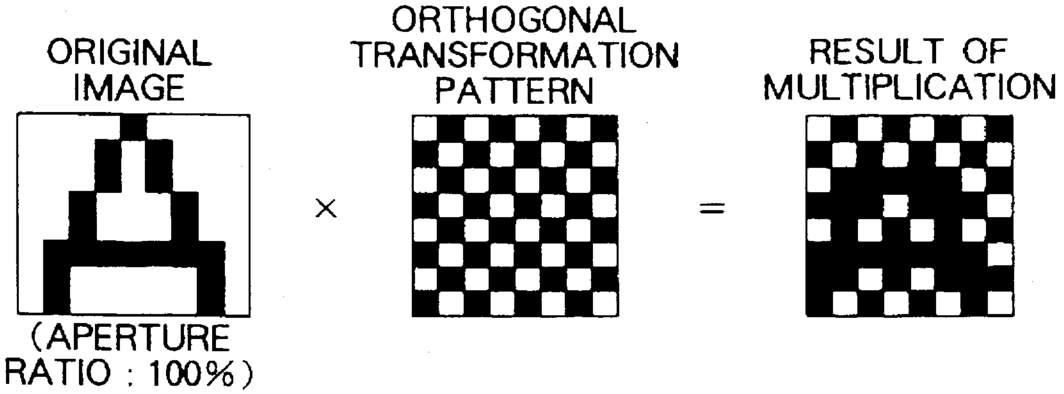
FIG. 14 PRIOR ART
FIG. 14 shows multiplication and its result by an existing optical processor.

As stated above, the experiment conducted using a mask having orthogonal transformation patterns with a dot size of 20 by 20 micrometers and on the condition of an alignment accuracy of 5 micrometers proved that the original image display means is acceptable if its pixels have an aperture ratio less than 25%. As can be seen from Table 1 and FIG. 14, for aperture ratios from 100 down to 25%, the imperfections in mask drawing have an adverse influence on the alignment and the values R indicate a humble logical operation accuracy. For aperture ratios less than 25%, however, such an influence diminishes and the logical operation accuracy shows a remarkable improvement. At an aperture ratio of 0.25%, the operation accuracy is somewhat lower, because too small an aperture ratio admits too small an amount of light to bring about the proper opto-electric conversion.

In the description of the embodiment above, no reference was made to method such as the time multiple expansion method, spatial multiple expansion method, and time-spatial expansion method. However, the present invention proposes the basic concept of setting the aperture ratio of the pixels of an original image display to display an original image smaller than the aperture ratio of the pixels of an orthogonal transformation pattern display to display orthogonal transformation patterns, and is useful for any method. When the spatial multiple expansion method or time-spatial multiple expansion method is to be used, however, image 4, namely, the first lens must be a lens array.

Another embodiment is described below in which the optical processor uses, as the orthogonal transformation pattern display, a fixed transmission mask on which patterns are so drawn as to cover the apertures of the pixels of the original image display.

Figure 12:
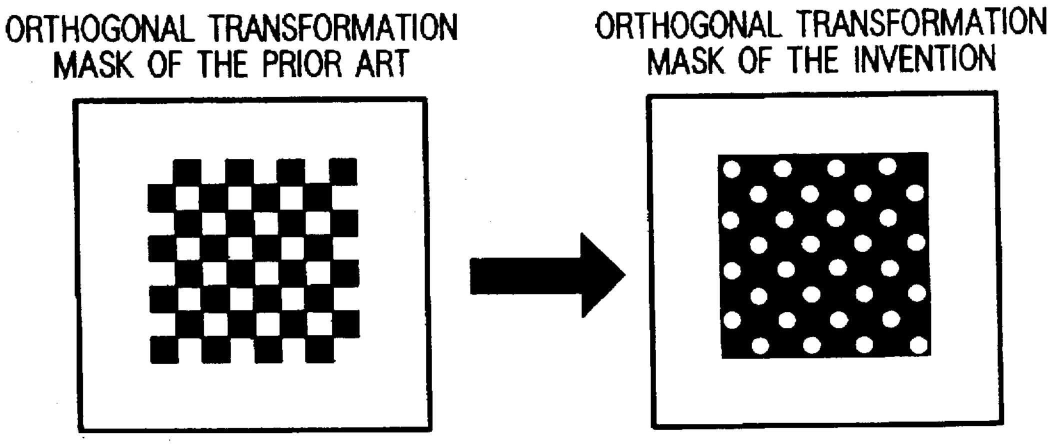
FIG. 12 shows the fixed transmission mask in another embodiment of the invention.

The fixed transmission mask used in this embodiment is shown in FIG. 12, together with an existing orthogonal transformation mask. As seen in this figure, the pixels of this fixed transmission mask are almost circular in form and can cover the apertures of the pixels of an original image displayed on the original image display. The pixels of the fixed transmission mask may assume such a form because the logical operation accuracy does not depend on the imperfections in the contour of the orthogonal transformation patterns if the original image display has pixels with a relatively small aperture ratio in comparison with those of the fixed transmission mask. The other parts of this embodiment can be set up in the same manner as the previous embodiment. In this embodiment, the pixels of the fixed transmission mask are not limited to this form but may take such another form that can cover the aperture of the pixels of the original image displayed on the original image display.

This embodiment is particularly useful when it is not necessary to replace patterns on the orthogonal transformation pattern display, namely, if a fixed transmission mask is used as in the case of the spatial multiple expansion method. This is described below.

Fabrication of fixed transmission masks is possible by photolithography, or by using an electron beam or excimer laser technique for selective removal of metal film evaporated onto the glass substrate, and formerly a fairly high accuracy was required for that. According to the present invention, however, it is not always necessary for fixed transmission masks to have pixels with the perfect contour, as in the case of the existing mask shown at the left of FIG. 12, because, as shown in FIG. 3, the original image display to display an original image has pixels with a smaller aperture ratio than the pixels of the fixed transmission mask to display orthogonal transformation patterns. Therefore, pixels of any form will do if they can cover the apertures of such an original image as at the right of FIG. 12, and a very high accuracy is not necessary in fabrication of fixed transmission masks. That is to say, a fixed transmission mask consisting of pixels having a form of square with rounded corners might not be used formerly as being defective, but may be used now as indicated in said another embodiment according to the present invention. Therefore, fabrication of fixed transmission masks can be carried out with great ease by photolithography or by using an electron beam or excimer laser technique for selective removal of metal film evaporated onto the glass substrate.

The above description took an example in which orthogonal transformation of an original image is carried out with a pattern display. However, the present invention is applied not only to orthogonal transformation with a pattern display but widely to optical logical operations that use a pattern display.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical processor for performing an optical operation on an original image, comprising:

multiplying operation means for performing an optical multiplying operation to said original image, including, original image display means for displaying said original image with a plurality of pixels each having a first aperture ratio, operation pattern display means for displaying an operation pattern corresponding to said optical operation with the same number of pixels of said original image display means and for transmitting an image therethrough, each of said pixels having a second aperture ratio, and imaging means for imaging said original image onto said operation pattern;

adding operation means for performing an optical adding operation to the image transmitted through said operation pattern display means, including, opto-electric conversion means for converting an optical signal into an electrical signal, condensing means for condensing said original image transmitted through said operation pattern display means onto said opto-electric conversion means; and electrical operation means for correcting said electrical signal output. from said opto-electric conversion means, wherein said first aperture ratio is smaller than said second aperture ratio.

2. The optical processor according to claim 1, wherein said first aperture ratio is determined from an alignment error between said original image display means and said operation pattern display means or a drawing error of said operation pattern display means, and a pixel size of said operation pattern display means.

3. The optical processor according to claim 2, wherein said first aperture ratio P is determined from the following equation:

$$P=(10-20\times I/m)^2,$$

wherein m is said pixel size of said operation pattern display means, and I is the larger one of said alignment error and said drawing error.

4. The optical processor according to claim 1, wherein at least one of said original image display means and said operation pattern display means is a spatial light modulator.

5. The optical processor according to claim 4, wherein said spatial light modulator is a liquid crystal panel.

6. The optical processor according to claim 1, wherein said operation pattern display means is a fixed transmission mask.

7. The optical processor according to claim 1, wherein said optical operation is Walsh-Hadamard transformation.

8. The optical processor according to claim 1, wherein said optical operation is an orthogonal transformation.

9. A method for performing an optical operation on an original image, comprising the steps of:

performing an optical multiplying operation on said original image, including displaying said original image on an original image display with a plurality of pixels each having a first aperture ratio, displaying an operation pattern corresponding to the optical operation on an operation pattern display with the same number of pixels of the original image display, each of said pixels having a second aperture ratio, wherein said first aperture ratio is smaller than said second aperture ratio, transmitting the original image through the operation pattern display, and imaging said original image onto said operation pattern; and performing an optical adding operation to the image transmitted through said operation pattern display, including, converting an optical signal into an electrical signal, condensing said original image transmitted through said operation pattern display prior to said converting step, and correcting said electrical signal output by said converting step.

10. The method according to claim 9, further comprising determining said first aperture ratio from an alignment error between said original image display and said operation pattern display or a drawing error of said operation pattern display, and a pixel size of said operation pattern display.

11. The method according to claim 10, further comprising determining said first aperture ratio P from the following equation:

$$P=(10-20\times I/m)^2,$$

wherein m is said pixel size of said operation pattern display, and I is the larger one of said alignment error and said drawing error.

* * * * *